(12) United States Patent
Lefevre et al.

(10) Patent No.: US 12,273,665 B2
(45) Date of Patent: Apr. 8, 2025

(54) ACKNOWLEDGMENT-BASED FLEXIBLE FEC SELECTION

(71) Applicant: Nokia Solutions and Networks Oy, Espoo (FI)

(72) Inventors: Yannick Lefevre, Heverlee (BE); Amitkumar Mahadevan, Edison, NJ (US); Werner Van Hoof, Aartselaar (BE)

(73) Assignee: Nokia Solutions and Networks Oy, Espoo (FI)

( * ) Notice: Subject to any disclaimer, the term of this patent is extended or adjusted under 35 U.S.C. 154(b) by 77 days.

(21) Appl. No.: 17/166,966

(22) Filed: Feb. 3, 2021

(65) Prior Publication Data
US 2022/0248110 A1  Aug. 4, 2022

(51) Int. Cl.
*H04Q 11/00* (2006.01)

(52) U.S. Cl.
CPC ..... *H04Q 11/0067* (2013.01); *H04Q 11/0066* (2013.01); *H04Q 2011/0079* (2013.01); *H04Q 2213/13168* (2013.01)

(58) Field of Classification Search
CPC ........................ H04Q 11/0066; H04Q 11/0067
See application file for complete search history.

(56) References Cited

U.S. PATENT DOCUMENTS

| | | | | |
|---|---|---|---|---|
| 2013/0156420 A1* | 6/2013 | Amitai | ................. | H04L 1/0009 398/27 |
| 2015/0033279 A1* | 1/2015 | Yun | ....................... | H04H 20/95 725/118 |
| 2019/0174212 A1* | 6/2019 | Detwiler | ............... | H04L 1/0009 |
| 2020/0304196 A1* | 9/2020 | Nammi | ............... | H03M 13/353 |
| 2021/0144693 A1* | 5/2021 | Qu | .................... | H04W 72/0406 |

FOREIGN PATENT DOCUMENTS

WO    2020078016 A1    4/2020

OTHER PUBLICATIONS

G.987.3, "10-Gigabit-capable passive optical networks (XG-PON): Transmission convergence (TC) layer specification", ITU-T, Oct. 2010 (Year: 2010).*
ITU-T, Recommendation G.9807.1 Amendment 1 "10-Gigabit-capable symmetric passive optical network (XGS-PON) Amendment 1." (Oct. 2017): 1-280.
Van Hoof, Werner, et al. "G.hsp.comTC: Scheme for flexible FEC in G.hsp upstream." D25, ITU-T Q2 conference call. (Dec. 15-17, 2020): 1-5.

(Continued)

*Primary Examiner* — Shi K Li
(74) *Attorney, Agent, or Firm* — Mendelsohn Dunleavy, P.C.; Steve Mendelsohn (57) ABSTRACT

An optical network unit (ONU) includes a transmitter and receiver to optically communicate with an optical line terminal (OLT) of a passive optical network. The ONU is configured to send an acknowledgment message to the OLT in response to a burst-profile message unicast by the OLT. The acknowledgement message indicates unsupported forward error correction (FEC) code in response to the burst-profile message identifying an FEC code for upstream transmission and the ONU not supporting the FEC code for upstream transmission to the OLT.

9 Claims, 5 Drawing Sheets

(56) References Cited

OTHER PUBLICATIONS

ITU-T, Recommendation G.989.3 Amendment 3 "40-Gigabit-capable passive optical networks (NG-PON2): Transmission convergence layer specification Amendment 3." (Mar. 2020): 1-259.

Lefevre, Yanick et al. "Forward Error Correction Control." U.S. Appl. No. 63/092,473, filed Oct. 15, 2020 (58 pages).

IEEE, Standard 802.3ca, "Amendment 9: Physical Layer Specifications and Management Parameters for 25 GB/s and 50 GB/s Passive Optical Networks." Document I.D. IEEE Std 802.3ca-2020 (Jul. 2020): 1-265.

Nokia Solutions and Networks Oy. "Method and Apparatus for ONU Activation." European application No. EP21155057.9; filed Feb. 3, 2021 (25 pages).

Yuanqiu Luo, et al., "Higher Speed Passive Optical Networks: Common Transmission Convergence Layer Specification." ITU-T Draft, Study Group 15, Recommendation ITU-T G.hsp.comTC (Oct. 2020): 1-239.

\* cited by examiner

ACKNOWLEDGMENT-BASED FLEXIBLE FEC SELECTION

BACKGROUND

Field of the Disclosure

The present disclosure relates to communications systems and, more specifically, to passive optical networks that employ forward error correction encoding.

Description of the Related Art

This section introduces aspects that may help facilitate a better understanding of the disclosure. Accordingly, the statements of this section are to be read in this light and are not to be understood as admissions about what is prior art or what is not prior art.

Forward error correction (FEC) may be used to support improved communications over passive optical networks (PONs).

BRIEF DESCRIPTION OF THE DRAWINGS

Embodiments of the disclosure will become more fully apparent from the following detailed description, the appended claims, and the accompanying drawings in which like reference numerals identify similar or identical elements.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

The 10-Gigabit-capable Symmetric Passive Optical Network (XGS-PON) Standard, ITU-T G.9807.1, Amendment 1, the teachings of which are incorporated herein by reference in their entirety, specifies requirements for conforming PON networks. According to the XGS-PON Standard, transmissions are (optionally) encoded using the same, predefined Reed-Solomon (RS) FEC code, in which outgoing data is encoded to provide redundant information that can be used by the recipient to detect and correct certain bit errors that can occur during transmission.

U.S. Provisional Patent Application No. 63/092,473, dated 10 Oct. 2020, the teachings of which are incorporated herein by reference in their entirety, provides implementation details about FEC coding in general and LDPC coding in particular.

Herein, various embodiments provide messaging structures and protocols to enable flexibility in upstream FEC coding. Such FEC coding flexibility may be useful, e.g., because lasers of optical network units (ONUs) are typically low cost and have variable quality. Also, the quality of transmissions may be limited by temperature variations and/or the distance of the ONU from the optical line terminal (OLT). Messaging structures of PON systems typically are limited by overhead constraints and implemented by standards. In light of these potential difficulties, various embodiments provide messaging structures to support flexibility in upstream FEC coding and also enable evolution of such flexibility, e.g., as a PON grows and/or evolves.

Figure 1:
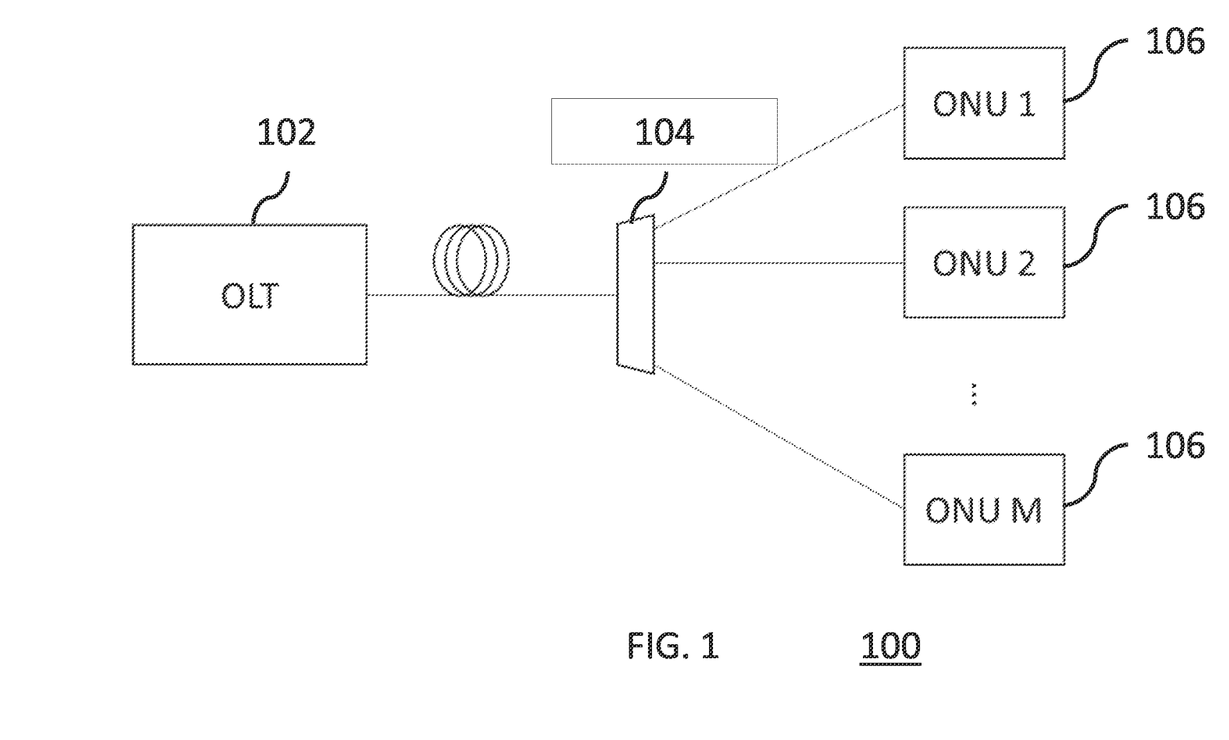
FIG. 1 is a block diagram of a PON network.

FIG. 1 is a block diagram of a PON network 100. The PON network 100 has a point-to-multi-point (P2MP) topology that includes an optical line terminal (OLT) 102 that transmits downstream optical signals to and receives upstream optical signals from a number of different optical network units (ONUs) 106 over an optical fiber plant 104 that contains optical fibers and splitters/combiners, but typically does not have active components. The optical fiber plant 104 is typically a passive optical distribution network with a tree-like architecture. The PON network 100 employs time-division multiplexing (TDM) in which each ONU 106 of the same upstream transmission wavelength may transmit upstream to the OLT 102 in a corresponding time window so that different ones of the ONUs 106 do not transmit upstream, on the same wavelength channel, in the same time window. Some PON networks conform to standards, such as the ITU G.989.3 (NG-PON2) Standard, that employ time- and wavelength-division multiplexing (TWDM) in which ONUs may transmit upstream signals using different wavelengths. Various PON networks rely on the ONUs being able to operate in a burst mode, in which an ONU transmits bursts of uplink signals during allocated time windows, during which only one ONU transmits at a given time for a particular wavelength channel.

In various embodiments, the PON network 100 typically supports a bi-directional messaging system between the OLT 102 and the ONUs 106, e.g., to support TDM operation. The messaging system will typically enable the OLT 102 to identify individual ONUs 106 and assign thereto time windows for optically transmitting upstream to the OLT 102, i.e., on a particular wavelength channel. The messaging system may also enable the OLT 102 to learn various characteristics of individual ones of the ONUs 106 and to assign thereto operating parameters for upstream optical transmissions.

In certain embodiments, such a messaging structure may be supported by physical-layer operation, administration, and management (PLOAM) messages. The OLT 102 may transmit downstream PLOAM messages, i.e., PLOAMd messages, to the ONUs 106 via the optical fiber plant 104, and the ONUs 106 may transmit upstream PLOAM messages, i.e., PLOAMu messages, to the OLT 102 via the fiber plant 104, e.g., in response to the PLOAMd messages or as requested by the OLT 102.

In one possible state of operation of the PON network 100, the OLT 102 operates in a continuous mode, in which the OLT 102 may continuously transmit signals to the ONUs 106, where those signals may include one or more unicast PLOAMd messages to one or more of the ONUs 106. A unicast PLOAMd message is a message transmitted from the OLT 102 to a specified ONU 106. Note that the fiber plant 104 passively broadcasts downstream signals from the OLT 102 to all ONUs 106, including unicast PLOAMd messages. While a unicast PLOAMd message may be received by each ONU 106, such a message contains information that identifies only a single ONU 106 as the intended recipient of the unicast PLOAMd message. Each ONU 106 may process such a unicast PLOAMd message to determine whether or not it is the intended recipient. If it is the intended recipient, that ONU 106 will continue to process that PLOAMd message appropriately, while other ONUs 106 will typically ignore the PLOAMd message after determining that they are not the intended recipient.

In the PON network 100, the OLT 102 may encode its downstream data signals using a pre-defined default FEC code, e.g., based on LPDC coding or RS coding. An FEC code is used to correct errors introduced during the communication of data. An FEC code can be used to, e.g., encode a set of data bits into a data codeword consisting of the data bits and a set of additionally generated parity bits, e.g., for use in encoding an upstream burst transmission. At the receiver, the FEC code can be used to decode the data codewords and correct any errors introduced during the communication, thus obtaining the error-free data bits. In various embodiments herein, one or more of the ONUs 106 of FIG. 1 may be individually and independently capable of transmitting upstream data signals to the OLT 102 using any one of two or more different pre-defined FEC codes, e.g., based on LDPC coding or RS coding. In some implementations, the two or more pre-defined FEC codes may include the same pre-defined default FEC code used by the OLT 120 and one or more pre-defined alternative (i.e., non-default) FEC codes. The OLT 102 knows what the pre-defined FEC codes are, but, other than the default FEC code, the OLT 102 does not have a priori knowledge of the one or more non-default FEC codes that may be individually and independently supported by the different ONUs 106.

In certain implementations of the present disclosure, each different FEC code is uniquely identified by (i) a baseline LDPC code, which is used for at least the majority of a burst, and (ii) possibly one or more burst-terminating LDPC codes for efficiency improvement of the last codeword in the burst. Each different LDPC code may be based on different puncturing and shortening of a single mother code, namely, the IEEE 802.3ca LDPC mother code, incorporated herein by reference in its entirety. Burst termination involves possibly using a different puncturing and minimum shortening for the last codeword in a burst in order to improve efficiency while still achieving bit-error rate (BER) performance equal to or better than the baseline LDPC code. Those skilled in the art will understand that different FEC codes will be more or less appropriate for use in transmitting signals over the fiber plant 104 depending on the current channel characteristics, trading off throughput vs. BER performance.

In certain embodiments, the OLT 102 may transmit unicast PLOAMd burst-profile messages to different ONUs 106 that specify different burst profiles for use by the ONUs 106 in their upstream burst-mode transmissions, where each burst profile is associated with an identified FEC code. Each ONU 106 that receives a unicast PLOAMd burst-profile message, processes the message to determine whether the ONU 106 supports the specified burst profile with the identified FEC code and transmits a PLOAMu acknowledgement (ACK) message back to the OLT 102 indicating the result of that processing. If the PLOAMu ACK message indicates that the ONU 106 supports the specified burst profile with the identified FEC code, then the OLT 102 may subsequently transmit a unicast PLOAMd burst-grant message to that ONU 106 indicating the time period for the ONU 106 to transmit upstream data using that burst profile and FEC code as indicated by a burst-profile index contained in the PLOAMd burst-grant message.

Note that, in some implementations, the OLT 102 maintains two different lists of FEC codes for each ONU 106: a first list of possible FEC codes (i.e., FEC codes that the ONU 106 might support) and a second list of supported FEC codes (i.e., FEC codes that the OLT 102 has previously determined are supported by the ONU 106). When a new ONU 106 is added to the PON network 100, the first list of possible FEC codes for that ONU 106 is initiated to include one or more non-default FEC codes, and the second list of supported FEC codes for that ONU 106 is initiated to include only the default FEC code. As described below in the context of FIGS. 2 and 3, over time, the OLT 102 may determine whether or not the ONU 106 supports one or more of the non-default FEC codes in the first list. If the messaging structure subsequently reveals that a particular non-default FEC code is supported by the ONU 106, then the OLT 102 will remove that non-default FEC code from the first list and add that same non-default FEC code to the second list. If the messaging structure reveals that the ONU 106 does not support a particular non-default FEC code, then the OLT 102 will remove that non-default FEC code from the first list and not add that same non-default FEC code to the second list.

Figure 2:
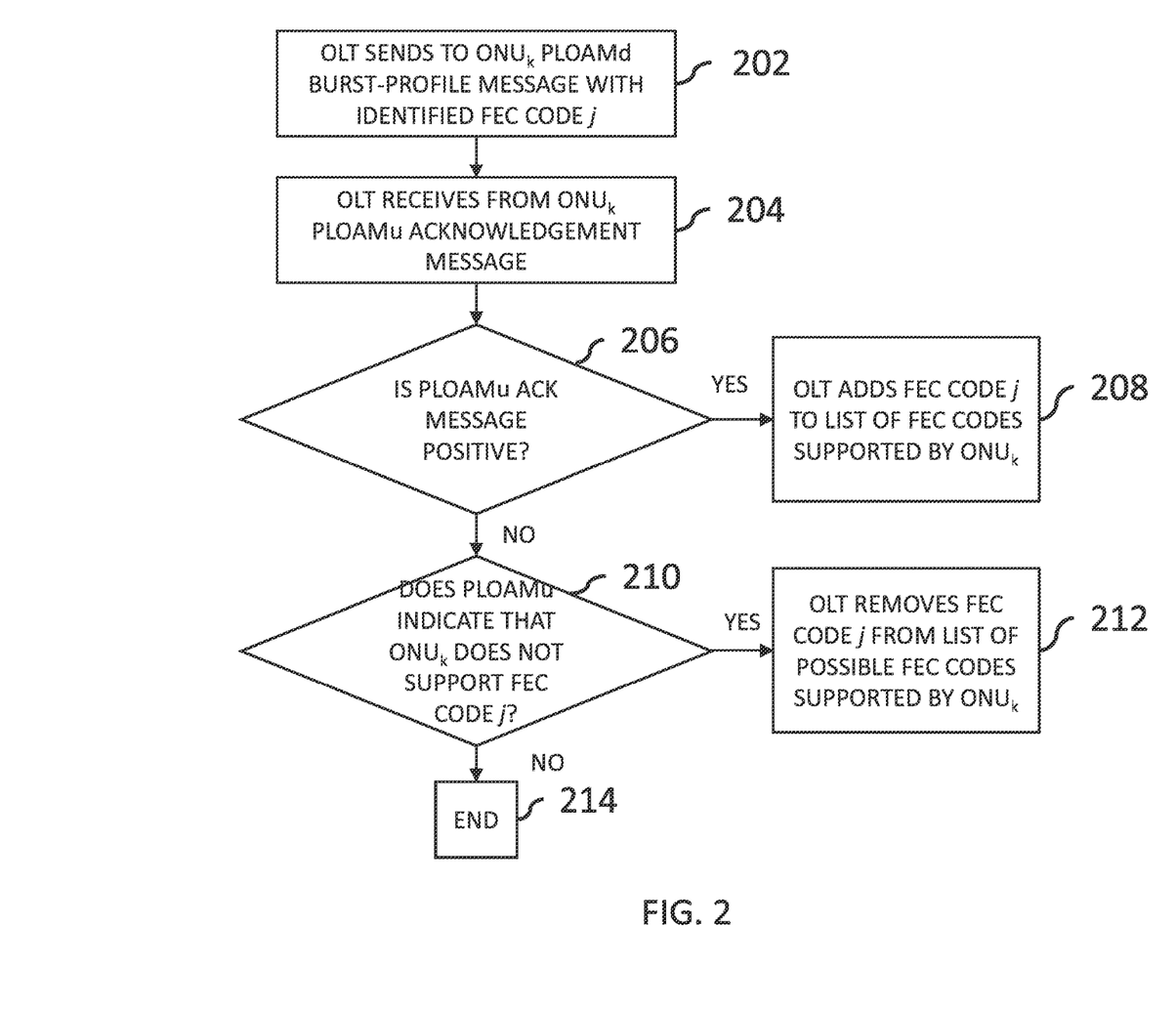
FIG. 2 is a flow diagram of the processing implemented by the OLT of FIG. 1 to determine whether a particular $ONU_k$ supports a specified burst profile have an identified FEC code j, according to certain embodiments of the disclosure.
Figure 3:
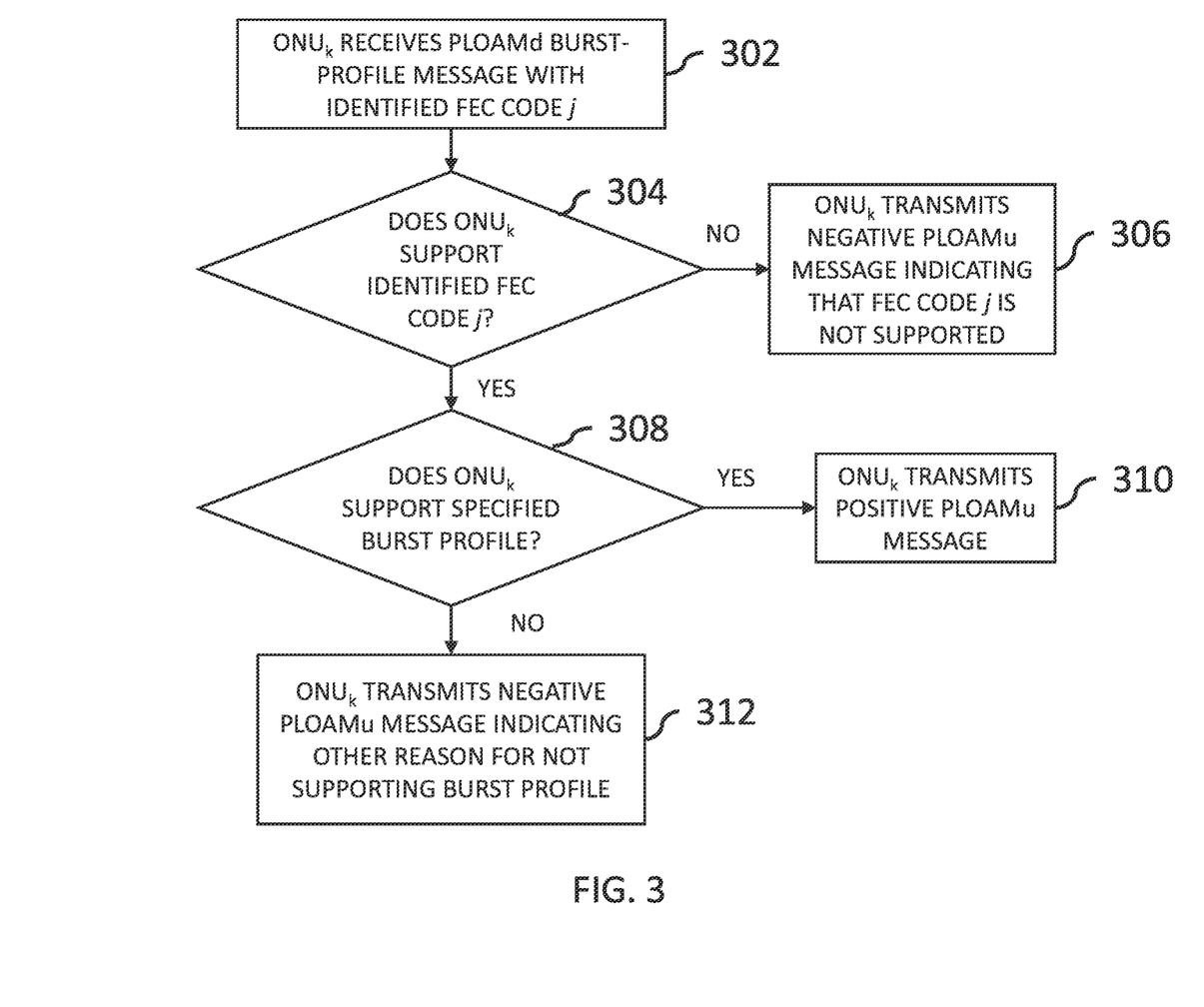
FIG. 3 is a flow diagram of the processing implemented at the $ONU_k$ of FIG. 2, in response to the receipt of the PLOAMd burst-profile message from the OLT, according to certain embodiments of this disclosure.

FIG. 2 is a flow diagram of the processing implemented by the OLT 102 of FIG. 1 to determine whether a particular $ONU_k$ 106 supports a specified burst profile have an identified non-default FEC code j, according to certain embodiments of the disclosure. FIG. 3 is a flow diagram of the processing implemented at the $ONU_k$ 106 of FIG. 2, in response to the receipt of the PLOAMd burst-profile message from the OLT 102, according to certain embodiments of this disclosure.

In Step 202 of FIG. 2, the OLT 102 sends to the $ONU_k$ 106 a unicast PLOAMd burst-profile message specifying a particular burst profile and identifying a particular FEC code j, where the FEC code j may be the default FEC code or a non-default FEC code. In certain embodiments, the unicast PLOAMd burst-profile message may contain (i) a two-bit burst-profile index in Octet 5 that identifies one of four different possible burst profiles and (ii) a multi-bit FEC-code index that identifies the particular FEC code j.

In certain embodiments, the two-bit burst-profile index value 0x00 is assigned to a specified burst profile having the default FEC code. Each other burst-profile index value (i.e., 0x01, 0x02, and 0x03) may be assigned to a different specified burst profile having either (i) the default FEC code or (ii) one of the non-default FEC codes.

In certain embodiments, the FEC-code index may have up to six bits in Octet 6, where the default FEC code is indicated by an FEC-code index value having all 0s and the non-default FEC codes are indicated by other FEC-code index values. For example, if the FEC-code index has four bits in Octet 6, then there may be up to 16 different FEC codes: the default FEC code and up to 15 different non-default FEC codes.

Referring now to Step 302 of FIG. 3, the $ONU_k$ 106 receives the unicast PLOAMd burst-profile message with the specified burst profile and the identified FEC code j transmitted by the OLT 102 in Step 202 of FIG. 2. In Step 304, the $ONU_k$ 106 determines whether the $ONU_k$ 106 supports the identified FEC code j. If not, then, in Step 306, the $ONU_k$ 106 transmits a "negative" PLOAMu ACK message to the OLT 102 indicating that the identified FEC code j is not supported. Otherwise, if the $ONU_k$ 106 supports the identified FEC code j, then, in Step 308, the $ONU_k$ 106 determines whether the $ONU_k$ 106 supports the other features of the specified burst profile. If so, then, in Step 310, the $ONU_k$ 106 transmits a positive PLOAMu ACK message to the OLT 102 indicating that the $ONU_k$ 106 supports the specified burst profile with the identified FEC code j. Otherwise, in Step 312, the $ONU_k$ 106 transmits a negative PLOAMu ACK message indicating the reason for not supporting the specified burst profile (i.e., a reason other than the $ONU_k$ 106 not supporting the identified FEC code j).

In certain embodiments, the PLOAMu ACK message may include an octet named Completion_code that has the following seven defined values:

0x00: OK,
0x01: No message to send,
0x02: Busy, preparing a response,
0x03: Unknown message type,
0x04: Parameter error,
0x05: Processing error, and
0x06: FEC code not supported, where the Completion_code value 0x06 indicates that the ONU 106 does not support the FEC code j identified in Octet 6 of the PLOAMd burst-profile message. The other possible values of the Completion_code octet may be available. Thus, in these embodiments, in Step 306, the $ONU_k$ 106 transmits a negative PLOAMu ACK message having the Completion_code value 0x06; in Step 310, the $ONU_k$ 106 transmits a positive PLOAMu ACK message having the Completion_code value 0x00; and, in Step 312, the $ONU_k$ 106 transmits a negative PLOAMu ACK message having one of the other Completion_code value indicating the particular reason for not supporting the specified burst profile.

In other possible embodiments, the Completion_code octet might not have the value 0x06 defined as listed above. In that case, in Step 306, the $ONU_k$ 106 may transmit a negative PLOAMu ACK message having one of the other Completion_code values, such as 0x04.

Referring again to FIG. 2, in Step 204, the OLT 102 receives the PLOAMu ACK message transmitted from the $ONU_k$ 106 in one of Steps 306, 310, and 312 of FIG. 3. In Step 206, the OLT 102 determines whether the PLOAMu ACK message is a positive ACK message, meaning that the $ONU_k$ 106 supports the specified burst profile with the identified FEC code j. If so, then, in Step 208, the OLT 102 updates the first and second lists of FEC codes for the $ONU_k$ 106 as appropriate. In particular, if the identified FEC code j is a non-default FEC code that is in the first list of possible FEC codes for $ONU_k$ 106, then the OLT 102 removes that non-default FEC code j from the first list and adds that non-default FEC code j to the second list of supported FEC codes for $ONU_k$ 106. Note that, if the identified FEC code j is the default FEC code or a non-default FEC code that is already in the second list, then the OLT 102 does nothing in Step 208.

Referring again to Step 206, if the OLT 102 determines that the PLOAMu ACK message is a negative ACK message, then, in Step 210, the OLT 102 determines whether the PLOAMu ACK message indicates that the $ONU_k$ 106 supports the identified FEC code j. If not, then, in Step 212, the OLT 102 updates the first list of possible FEC codes for the $ONU_k$ 106 as appropriate. In particular, if the identified FEC code j is a non-default FEC code that is in the first list of possible FEC codes for $ONU_k$ 106, then the OLT 102 removes that non-default FEC code j from the first list, but does not update the second list of supported FEC codes for $ONU_k$ 106. Note that, if the identified FEC code j is the default FEC code or a non-default FEC code that is not in the first list, then the OLT 102 does nothing in Step 212.

If, in Step 210, the OLT 102 determines that the $ONU_k$ 106 fails to support the specified burst profile for some reason other than not supporting the identified FEC code j, then the processing of FIG. 2 ends at Step 214 with the OLT 102 updating neither the first list nor the second list.

Note that, if the OLT 102 fails to receive a PLOAMu ACK message from the $ONU_k$ 106 within a specified duration of transmitting the PLOAMd burst-profile message in Step 202, the OLT 102 responds in some other appropriate manner not related to whether or not the $ONU_k$ 106 supports the specified burst profile and the identified FEC code j.

Figure 4:
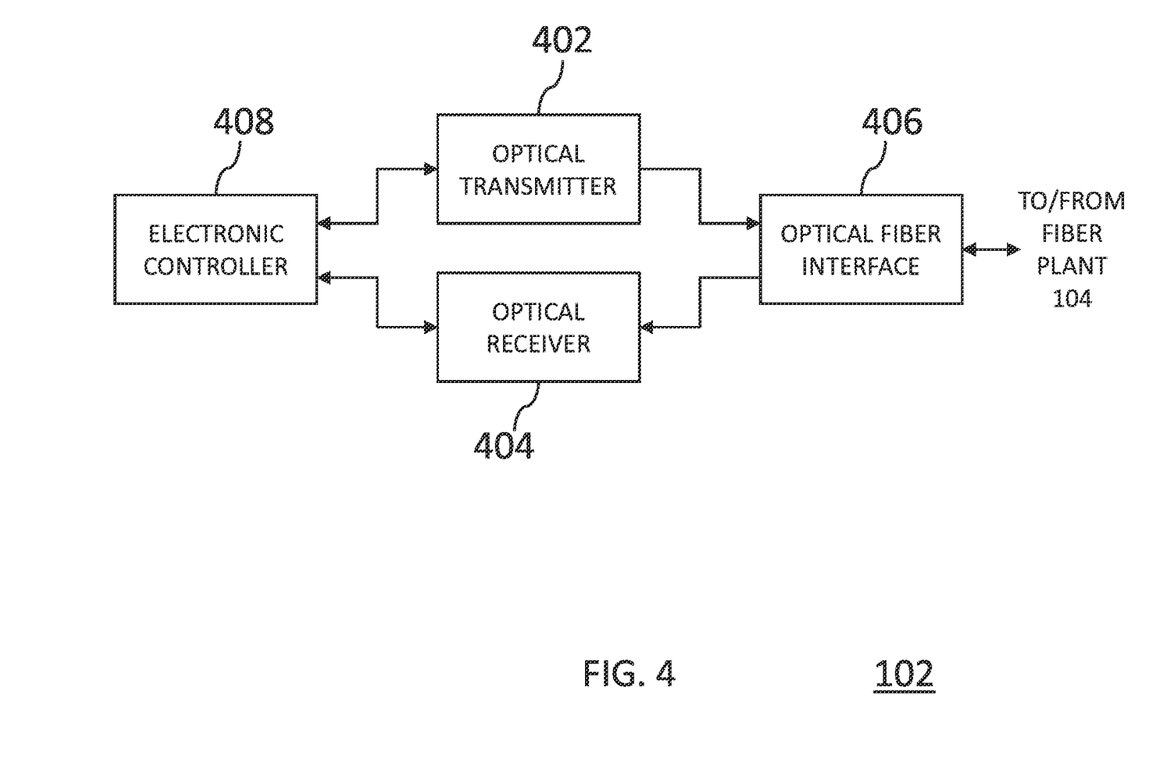
FIG. 4 schematically illustrates an example of the OLT of FIG. 1.
Figure 5:
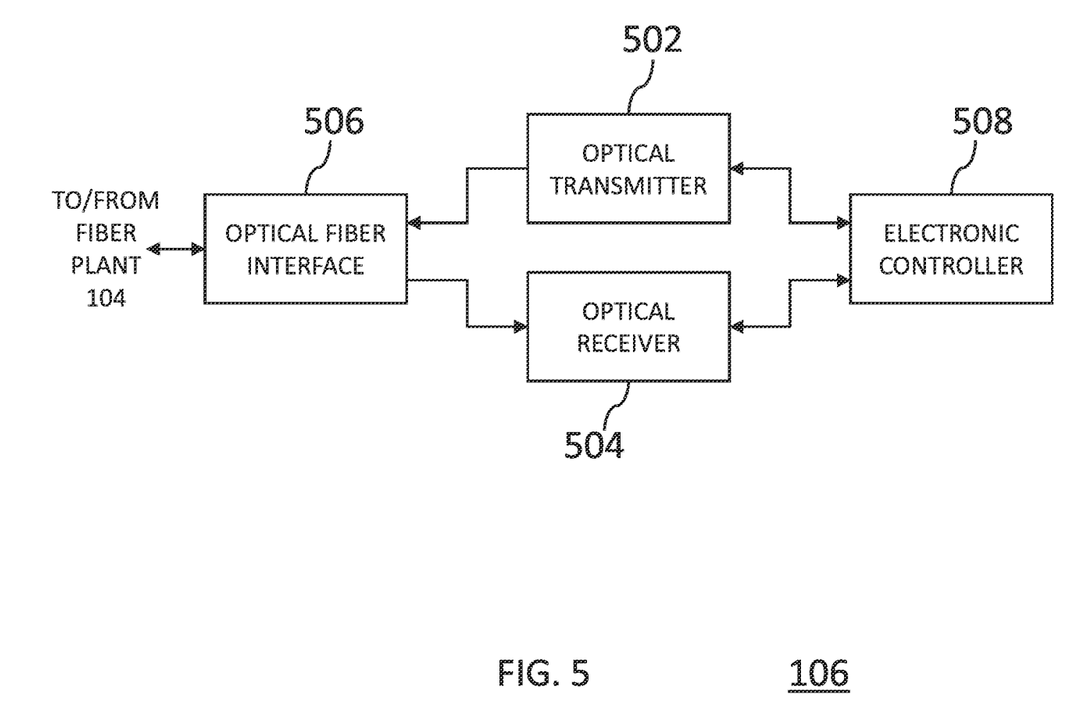
FIG. 5 schematically illustrates an example of an ONU of FIG. 1.

FIGS. 4 and 5 schematically illustrate examples of the OLT 102 and ONUs 106, respectively, of FIG. 1. Each OLT 102 and ONU 106 has an optical transmitter 402/502 and an optical receiver 404/504 that are connected via an optical fiber interface 406/506, e.g., a conventional optical fiber port, to the optical fiber plant 104 of the PON 100 of FIG. 1. In the ONU 106 of FIG. 5, the optical transmitter 502 transmits optical signals over the fiber plant 104 upstream to the OLT 102, and the optical receiver 504 receives optical signals via the fiber plant 104 downstream from the OLT 102. In the OLT 102 of FIG. 4, the optical transmitter 402 transmits optical signals over the fiber plant 104 downstream to the ONUs 106, and the optical receiver 404 receives optical signals via the fiber plant 104 upstream from the ONUs 106. In various embodiments, the optical transmitters 402/502 and optical receivers 404/504 may include various conventional hardware for processing optical signals, e.g., in conventional PON or other optical networks. In addition, each of the OLT 102 and the ONUs 106 has an electronic controller 408/508 configured to control data communications and the various message transmission and processing features of the optical transmitter 402/502 and optical receiver 404/504 therein. For example, the electronic controllers 408/508 typically support digital message processing to support various ones of the steps of the methods illustrated in FIGS. 2 and 3.

In certain embodiments, the present disclosure is an apparatus comprising an optical network unit (ONU) comprising a receiver and a transmitter to optically communicate with an optical line terminal (OLT) of a passive optical network. The ONU is configured to send an acknowledgment message to the OLT in response to receiving a burst profile message unicast by the OLT such that the acknowledgement message indicates unsupported forward error correction (FEC) code in response to the burst profile message identifying an FEC code for encoding upstream burst transmission and the ONU not supporting the FEC code for encoding upstream burst transmission to the OLT.

In at least some of the above embodiments, the burst profile message is a downstream physical layer operations, administration and maintenance (PLOAM) message, and the acknowledgement message is an upstream PLOAM message.

In at least some of the above embodiments, the ONU is configured to use a predefined set of six or less bits of received burst profile messages to determine FEC codes for upstream burst transmission identified therein.

In at least some of the above embodiments, the ONU is configured to indicate a not supported first FEC code for upstream burst transmission to the OLT by setting a completion code value in a PLOAM acknowledgement message.

In at least some of the above embodiments, the ONU is configured to use the same completion code value to indicate in a PLOAM acknowledgement message that a second FEC code is not supported for encoding upstream burst transmission to the OLT.

In at least some of the above embodiments, the same completion code value indicates only that the identified FEC code is not supported by the ONU.

In at least some of the above embodiments, the ONU is configured to transmit the acknowledgment message with an indication of supported FEC code in response to the ONU supporting the identified FEC code for encoding upstream transmission to the OLT.

In at least some of the above embodiments, the ONU is enabled to send a burst transmission to the OLT using a particular FEC code in response to the OLT transmitting a message to the ONU requesting that the ONU use the particular FEC code and the ONU having transmitted the acknowledgement message with the indication supported FEC code therein in response to the received burst profile message identifying the particular FEC code.

In at least some of the above embodiments, the ONU supports at least two different FEC codes for upstream transmission to the OLT.

In at least some of the above embodiments, the two different FEC codes are both obtainable by puncturing and/or shortening a mother code based on an LDPC type of FEC.

In certain embodiments, the present disclosure is an apparatus comprising an OLT having a transmitter and receiver to optically communicate with ONUs of a PON, the OLT being configured to unicast a burst profile message to one of the ONUs such that the burst profile message identifies one FEC code for encoding upstream burst transmission, the OLT being configured to identify the one FEC code as not supported by the one of the ONUs in response to receiving an acknowledgement message responsive to the burst profile message, the acknowledgement message indicating unsupported FEC code for encoding upstream burst transmission.

In at least some of the above embodiments, the burst-profile message is downstream physical layer operations, administration and maintenance (PLOAM) message, and the acknowledgement message is an upstream PLOAM message.

In at least some of the above embodiments, the OLT is configured to use a predefined set of six or less bits of burst profile messages to identify FEC codes for encoding upstream burst transmissions.

In at least some of the above embodiments, the OLT is configured to identify the one FEC code as supported for encoding upstream burst transmission by the one of the ONUs in response to receiving responsive to the burst-profile message an acknowledgement message with an indication of supported FEC code for encoding upstream burst transmission.

In at least some of the above embodiments, the OLT is configured to be enabled to request a burst from the one of the ONUs using the one FEC code in response to receipt of the acknowledgement message to the burst profile message indicating a supported FEC code for encoding upstream burst transmission.

In at least some of the above embodiments, the OLT is configured to use a value of a completion code in an upstream PLOAM acknowledgement message to determine that an FEC code is unsupported by an ONU for encoding upstream burst transmission.

In at least some of the above embodiments, the OLT is configured to identify multiple FEC codes as being not supported for upstream transmission by the same value of the completion code.

In at least some of the above embodiments, the same completion code value indicates only that the one FEC code is not supported by the ONU.

Embodiments of the disclosure may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, general-purpose computer, or other processor.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software-based embodiment (including firmware, resident software, micro-code, and the like), an entirely hardware embodiment, or an embodiment combining software and hardware aspects that may generally be referred to herein as a "system."

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the disclosure. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value or range.

Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

It will be further understood that various changes in the details, materials, and arrangements of the parts which have been described and illustrated in order to explain embodiments of this disclosure may be made by those skilled in the art without departing from embodiments of the disclosure encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the disclosure.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

What is claimed is:

1. An apparatus, comprising:
an optical network unit (ONU) comprising a receiver and a transmitter to optically communicate with an optical line terminal (OLT) of a passive optical network; and
wherein the ONU is configured to send a response to the OLT in response to receiving a management message unicast by the OLT, the management message providing instructions including an identified forward error correction (FEC) code for use by the ONU in upstream burst transmission to the OLT; and
wherein the ONU is configured to send the response as a first negative acknowledgement and explicitly indicate in the response that the identified FEC code is not supported for encoding upstream burst transmission to the OLT in response to the ONU not supporting the identified FEC code for encoding upstream burst transmission to the OLT; and
wherein the ONU is configured to send the response as a second negative acknowledgement and explicitly indicate in the response that the instructions are not supported for use by the ONU in upstream burst transmission to the OLT in response to the ONU not supporting the instructions for use by the ONU in upstream burst transmission to the OLT for a different reason other than the ONU not supporting the identified FEC code; and
wherein the ONU is configured to send the response as a positive acknowledgement and explicitly indicate in the response that the instructions including the identified FEC code are supported for use by the ONU in upstream burst transmission to the OLT in response to the ONU supporting the instructions including the identified FEC code for use by the ONU in upstream burst transmission to the OLT.

2. The apparatus of claim 1, wherein:
the management message is a downstream physical layer operations, administration and maintenance message; and
the response is an upstream physical layer operations, administration and maintenance message.

3. The apparatus of claim 1, wherein the ONU is configured to indicate in the response that the FEC code is unsupported for encoding upstream burst transmission by setting a completion code value in the response.

4. The apparatus of claim 1, wherein the ONU supports at least two different FEC codes for encoding upstream burst transmission to the OLT.

5. The apparatus of claim 4, wherein the two different FEC codes are both obtainable by puncturing and/or shortening a single mother code based on an LDPC type of FEC.

6. An apparatus, comprising:
an optical line terminal (OLT) having a transmitter and receiver to optically communicate with optical network units (ONUs) of a passive optical network, the OLT being configured to unicast a management message to an ONU of the optical network units such that the management message provides instructions including an identified forward error correction (FEC) code for use by the ONU in upstream burst transmission to the OLT; and
wherein the OLT is configured to identify the identified FEC code as not supported by the ONU in response to receiving a first response to the management message from the ONU, the first response being a first negative acknowledgment and explicitly indicating in the first response that the identified FEC code is not supported by the ONU for encoding upstream burst transmission to the OLT; and
wherein the OLT is configured to identify the instructions as not supported for use by the ONU in upstream burst transmission to the OLT in response to receiving a second response to the management message from the ONU, the second response being a second negative acknowledgment and explicitly indicating in the response that the instructions are not supported for use by the ONU in upstream burst transmission to the OLT for a different reason other than the ONU not supporting the identified FEC code; and
wherein the OLT is configured to identify the identified FEC code as supported by the ONU in response to receiving a third response to the management message from the ONU, the third response being a positive acknowledgement and explicitly indicating that the instructions including the identified FEC code are supported by the ONU for use in upstream burst transmission to the OLT.

7. The apparatus of claim 6, wherein:
the management message is a downstream physical layer operations, administration and maintenance message; and
the responses are upstream physical layer operations, administration and maintenance messages.

8. The apparatus of claim 6, wherein the optical line terminal is configured to use a predefined set of six or less bits of the management messages to identify forward error correction codes for encoding upstream burst transmissions.

9. The apparatus of claim 6, wherein the optical line terminal is configured to learn characteristics of the one of the optical network units from the received response.

* * * * *